T. Ruhle,
Water Wheel,
N° 1,307.            Patented Aug. 29, 1839.

UNITED STATES PATENT OFFICE.

THOMAS RUBLE, OF ST. MARY'S TOWNSHIP, ADAMS COUNTY, INDIANA.

IMPROVEMENT IN THE MODE OF LETTING THE WATER UPON WATER-WHEELS.

Specification forming part of Letters Patent No. 1,307, dated August 29, 1839.

*To all whom it may concern:*

Be it known that it, THOMAS RUBLE, of St. Mary's township, Adams county, and State of Indiana, have invented a new and useful Improvement in Water-Wheels for Propelling Mills, called "Ruble's Improved Water-Wheel," which is described as follows, reference being had to the annexed drawings of the same, making part of this specification.

Figure 1:
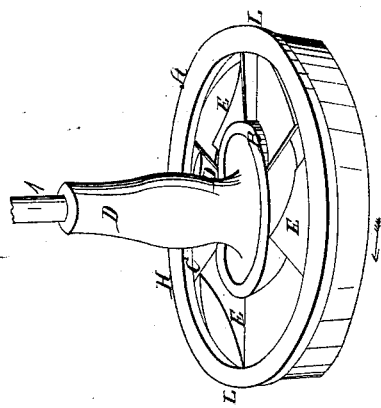
Figure 2:
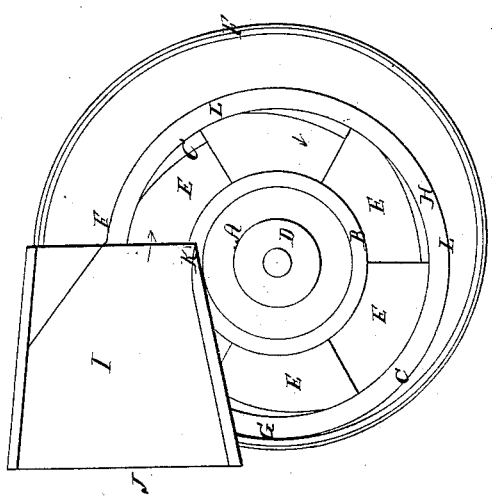

Figure 1 represents a perspective view of the wheel detached from the chute. Fig. 2 represents a top view of the wheel and chute combined.

Similar letters refer to similar parts.

I first construct a wheel A of cast-iron or of any other material preferred. This wheel is composed of two circular rims B C, placed horizontally and fixed to a perpendicular shaft D. Between these two rims are arranged any convenient number of buckets E, in such a manner as to cause the water to act on them with the greatest effect, the wheel turning in a contrary direction to that in which the water leaves them.

Around the periphery of the wheel is formed a lip or projection L for preventing the escape of the water between the wheel and bottom of the curved chute. This wheel is encircled by a close case F, of a peculiar shape to direct the water to all the buckets E of the wheel simultaneously with the greatest possible effect. It commences at the foot of the straight chute I. At the point where the chute F joins the chute I its surface is at an angle of about forty-five degrees with the axis of the wheel and gradually approaches to a perpendicular until it reaches the other side of the chute I at G, at which point it is parallel with the said axis of the wheel, and is of a uniform depth perpendicularly, which can be increased according to the head of water to be used on the wheel. The spiral chute F runs a few inches into the straight chute I, at the before-mentioned angle of forty-five degrees, and then tapers off to a point at the bottom and against the perpendicular side of the straight chute I. The bottom of the straight chute I is made wider at its mouth J than at its connection with the spiral chute, or where the water is discharged upon the buckets of the wheel, and is placed at an angle of about twenty degrees with a horizontal plain. Its sides are vertical. The one nearest the center of the wheel is scarfed or beveled off to an edge at the lower end at K.

The invention claimed and desired to be secured by Letters Patent consists—

In the curved chute, in combination with the straight chute, as before described, for letting the water on the buckets of the horizontal water-wheel.

THOMAS RUBLE.

Witnesses:
  WM. BISHOP,
  EDMD. MAHERE.